United States Patent
Bromage et al.

(10) Patent No.: US 7,253,947 B2
(45) Date of Patent: Aug. 7, 2007

(54) PORTABLE AUTOMATED CONFOCAL MICROSCOPE

(75) Inventors: Timothy G. Bromage, New York, NY (US); Alan Boyde, London (GB); Alejandro Perez-Ochoa, Madrid (ES)

(73) Assignee: New York University, New York, NY (US)

( * ) Notice: Subject to any disclaimer, the term of this patent is extended or adjusted under 35 U.S.C. 154(b) by 125 days.

(21) Appl. No.: 10/960,325

(22) Filed: Oct. 7, 2004

(65) Prior Publication Data

US 2006/0077536 A1    Apr. 13, 2006

(51) Int. Cl.
*G02B 21/00* (2006.01)

(52) U.S. Cl. ............... 359/368; 359/382; 248/432
(58) Field of Classification Search ........ 359/368, 359/382, 384; 248/431–432, 165–167
See application file for complete search history.

(56) References Cited

U.S. PATENT DOCUMENTS

| | | | | |
|---|---|---|---|---|
| 1,424,941 A * | 8/1922 | Pirwitz | ............... | 33/577 |
| 1,458,143 A * | 6/1923 | Muller | ............... | 396/432 |
| 2,604,815 A * | 7/1952 | Engelmann | ............... | 108/1 |
| 3,508,835 A * | 4/1970 | Ware | ............... | 356/396 |
| 4,585,351 A * | 4/1986 | Gronek et al. | ............... | 356/388 |
| 5,450,233 A * | 9/1995 | Yamamoto et al. | ............... | 359/368 |
| 5,835,807 A * | 11/1998 | Brock | ............... | 396/419 |
| 6,181,474 B1 * | 1/2001 | Ouderkirk et al. | ............... | 359/629 |
| 6,283,421 B1 * | 9/2001 | Eason et al. | ............... | 248/170 |
| 7,021,221 B2 * | 4/2006 | Del Frari | ............... | 108/42 |
| 7,061,672 B2 * | 6/2006 | Faber | ............... | 359/381 |
| 2002/0058862 A1 * | 5/2002 | Furnas et al. | ............... | 600/300 |
| 2003/0184855 A1 * | 10/2003 | Yasuda et al. | ............... | 359/383 |
| 2005/0219658 A1 * | 10/2005 | Miyahara | ............... | 358/509 |

\* cited by examiner

*Primary Examiner*—Mark A. Robinson
*Assistant Examiner*—Lee Fineman
(74) *Attorney, Agent, or Firm*—Fay Kaplun & Marcin, LLP.

(57) ABSTRACT

Described is a portable confocal microscope which includes a microscope stand including a shaft having top and bottom ends, a platform connected to the shaft by a height adjustment mechanism, a base member connected to the bottom end of the shaft and first and second elongated channel members slidably and rotatably connected to the base member, an optical assembly including an objective lens including a first position adjustment mechanism for adjusting a position of the objective lens along a first axis, a confocal module transmitting light to and receiving light from a specimen to be imaged via the optical assembly, an image acquisition system recording images through the optical assembly, a specimen stage including a position adjustment mechanism for moving the stage along a second and third axis, and a computer controlling the first and second position adjusting mechanisms to generate an image for recording by the image acquisition system.

20 Claims, 5 Drawing Sheets

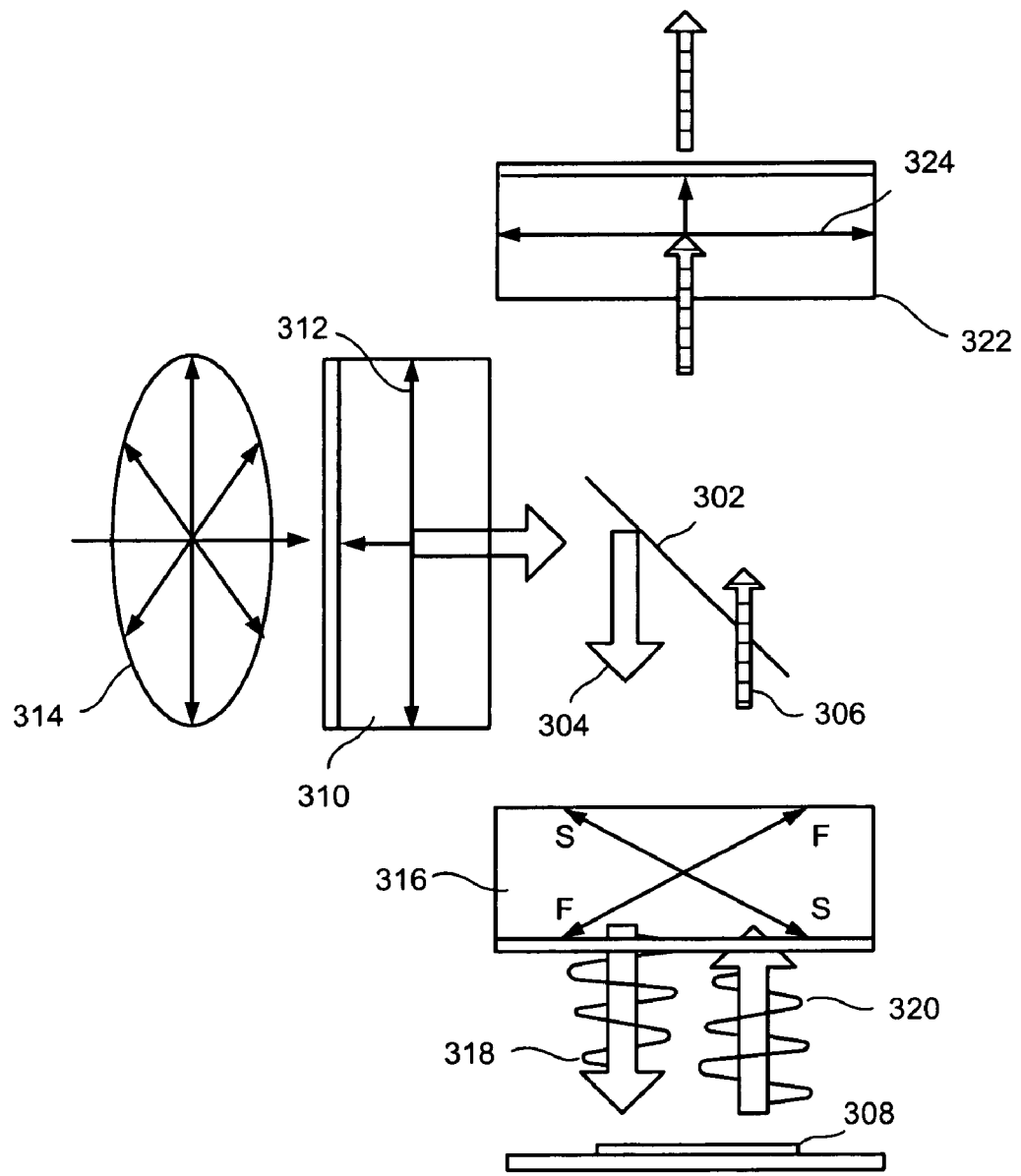
F I G. 3

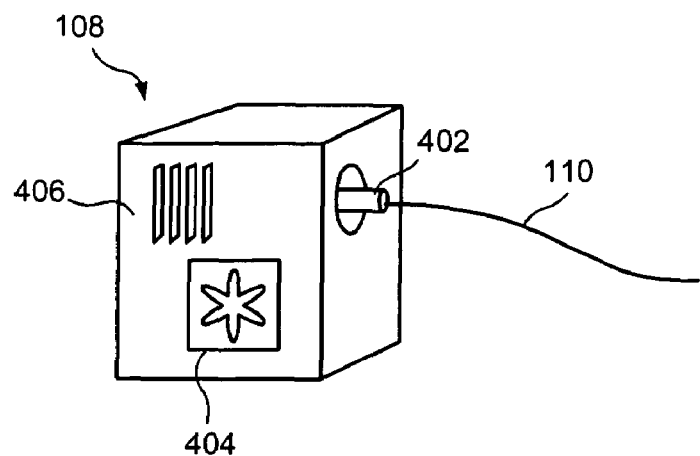
F I G. 4
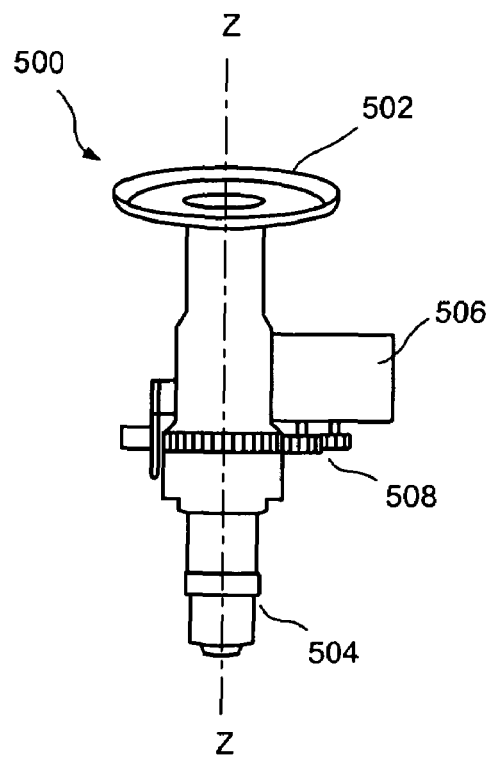
F I G. 5

PORTABLE AUTOMATED CONFOCAL MICROSCOPE

FIELD OF INVENTION

The present invention relates generally to confocal scanning microscopes and in particular, to a portable automated confocal microscope.

BACKGROUND INFORMATION

The confocal microscope is widely used in many areas of biological and medical research because of its ability to image subsurface features with high resolution and contrast. The operating principle of a confocal scanning optical microscope ("CSOM") is that an illuminating beam of light is scanned across a field of view from which only light emerging from a focal plane of an objective lens contributes to image formation. This differs from conventional light microscopy, wherein light from the focus plane of the objective lens, as well as from all out of focus planes across the entire field of view, is observed. In practice, the focal plane can be positioned below the surface of an opaque material for the non-destructive imaging of microscopic details at depth, or it may be positioned on the surface of a reflective material for observing high-resolution surface detail.

CSOMs are generally available in two basic configurations. The first scans a high intensity laser across the field of view with a computer compiling an image from the scan. These laser CSOM devices are generally too heavy and sensitive to motion to be portable. The second configuration uses a rotating "Nipkow" disk with a series of pinholes formed therein to transmit portions of an illuminating beam of light to and from the object to compile an image in real time. The image compiled from a Nipkow CSOM is generally visible through objective eyepieces without computer compilation.

Nipkow disks typically contain thousands of perforations (e.g., 32,000 or more), each having a diameter of about 50 microns. These perforations are generally arranged as a series of Archimedean spirals. In operation, the disk is spun to rotate the series of precisely aligned perforations across an incident light beam to create an incident light scan with returning light directed back through the disk. One available form of a Nipkow disk CSOM uses both sides of the rotating disk, e.g., one side for light passing to the specimen and the other side for light returning from the specimen. Because the precise alignment of multiple internal mirrors is required to obtain an accurate image, these instruments are very sensitive to motion and are not easily portable. In fact, even limited motion of such devices may require time consuming realignment of the mirrors. Although Nipkow disk CSOMs using only one side of the rotating disk for both purposes are less motion sensitive, current devices achieved the required base stability only through a heavy, non-adjustable base permanently mounted to the optics.

SUMMARY

The present invention relates to a portable confocal microscope, comprising a portable microscope stand including a shaft having top and bottom ends, a platform connected to the shaft by a height adjustment mechanism so that the position of the platform along the shaft may be varied, a base member connected to the bottom end of the shaft and first and second elongated channel members slidably and rotatably connected to the base member, the first and second channel members extending in a plane substantially perpendicular to an axis of the shaft, an optical assembly including an objective lens including a first position adjustment mechanism for adjusting a position of the objective lens along a first axis, a confocal module transmitting light to and receiving light from a specimen to be imaged via the optical assembly, an image acquisition system recording images through the optical assembly, a specimen stage for supporting the specimen to be imaged including a position adjustment mechanism for moving the stage along a second and third axis, and a computer controlling the first and second position adjusting mechanisms to generate a desired image for recording by the image acquisition system.

BRIEF DESCRIPTION OF THE DRAWINGS

FIG. 3 shows the operation of an exemplary embodiment of a Nipkow disk confocal module according to the present invention.

FIG. 4 shows schematically an illumination system according to the present invention.

FIG. 5 shows schematically an exemplary embodiment of an optical assembly according to the present invention.

DETAILED DESCRIPTION

The present invention is directed to a confocal scanning optical microscope ("CSOM"). In particular, the present invention is directed to a lightweight portable confocal microscope using single-sided Nipkow disk technology. The present invention includes a confocal module, an optical assembly, illumination system, image acquisition system, portable microscope stand, power requirements, and travel cases that may be assembled in a unit capable of transport and quickly and easily set-up in remote locations.

Figure 1:
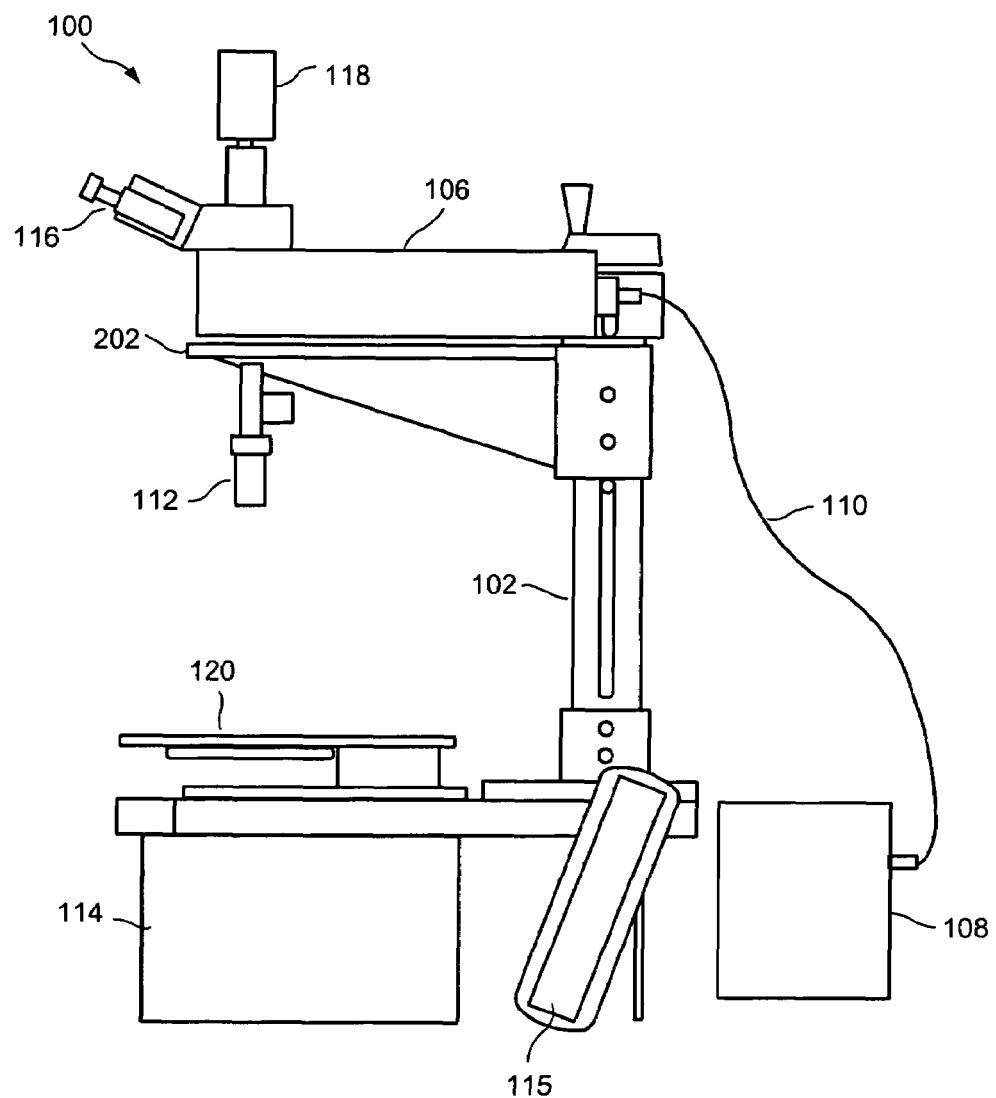
FIG. 1 shows schematically a portable confocal microscope according to the present invention.
Figure 2A:
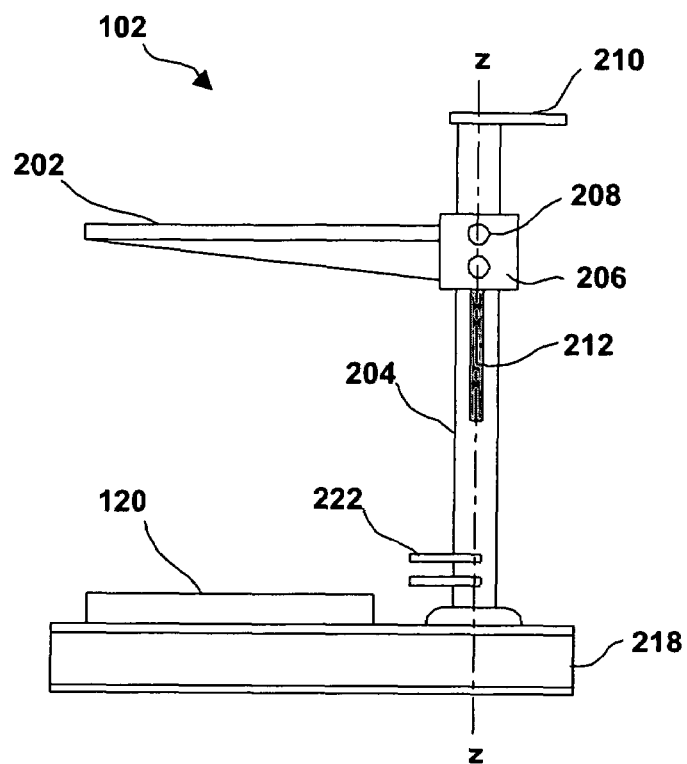
FIG. 2A shows schematically a side view of an exemplary embodiment of a portable stand according to the present invention.
Figure 2B:
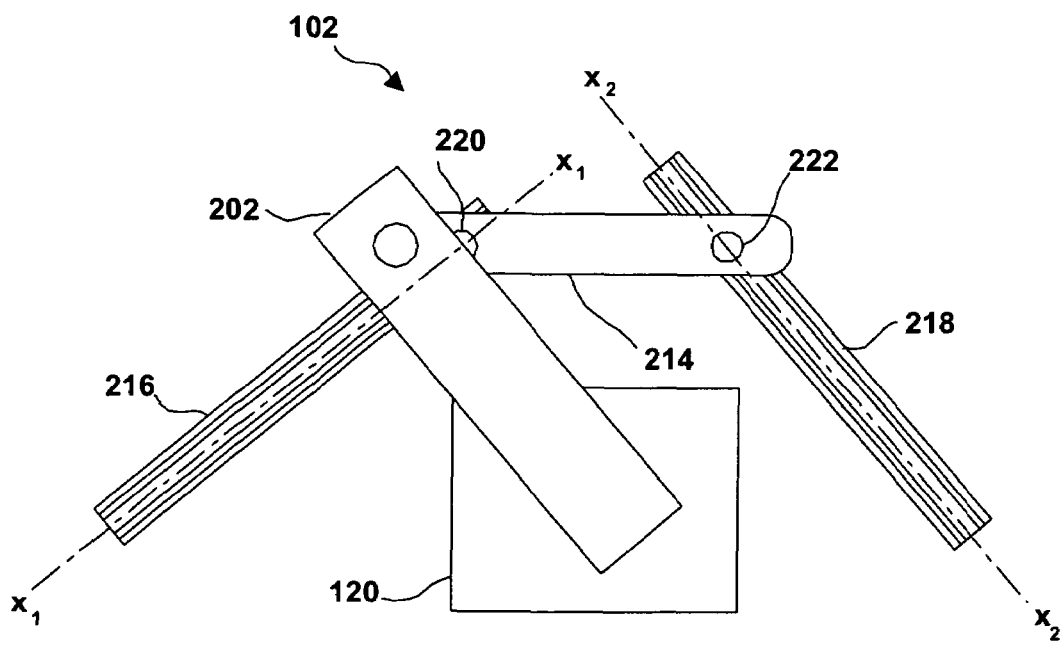
FIG. 2B shows schematically a top view of an exemplary embodiment of a portable stand according to the present invention.

FIG. 1 shows an exemplary embodiment of a portable confocal microscope assembly 100 according to the present invention. The microscope assembly 100 includes a portable stand 102 designed to support the components of the microscope assembly 100. An exemplary embodiment of the portable stand 102 is shown in FIGS. 2A and 2B. The portable stand 102 may be comprised primarily of aluminum components or any other lightweight and sufficiently rigid material(s). As shown in FIG. 2A, the portable stand 102 includes an adjustable platform 202. The platform 202 may be removably connected to a single shaft 204 via a coupling 206 (e.g., height adjustment mechanism). The coupling 206 may include one or more locking screws 208 to lock or fasten the platform 202 in a desired position on the shaft 204. In the exemplary embodiment, the coupling is a cylindrical sleeve containing two compressible plastic rings (not shown). The locking screws 208 may compress the plastic rings, thus conforming the plastic rings to the shaft's diameter and securing the position of the platform 202 by friction.

The vertical position of the platform 202 may be manually adjusted up or down along a z-axis on the shaft 204. For example, the portable stand 102 may include a crank 210 that rotates a lead screw 212 within the shaft 204 to raise and lower the platform 202. In the exemplary embodiment, the lead screw 212 is comprised primarily of steel and provides 6 mm of vertical adjustment for every three hundred and sixty (360) degrees rotation of the lead screw 212. Furthermore, the platform 202 may be rotated about the shaft 204 (e.g., in a substantially horizontal plane) by rotating the coupling 206 around the shaft 204. The platform 202 may then be locked in a desired orientation and z-axis position by turning the locking screws 208 as described above.

Shown in FIG. 2B, the portable stand 102 includes a base 214. The base 214 which is preferably removably connected to the shaft 204 via a release mechanism 224 (shown in FIG. 2A). As would be understood by those skilled in the art, the more components of the assembly 100 which are removable from one another, the more compactly the assembly 100 may be stored when disassembled for transport. However, more or fewer of the components may be made removable from one another to achieve an optimum travel configuration so long as set up time and effort do not become overly burdensome.

The base 214 is mounted on two channel members 216 and 218, shown in FIGS. 2A and 2B. Each of the channel members 216 and 218 may be adjustably positioned to provide optimal stability for the microscope assembly 100. For example, each of the respective channel members 216, 218 is preferably rotatable about the respective connection points 220, 222. In the preferred embodiment, the channel members 216, 218 are rotatable through three hundred and sixty (360) degrees about their respective connection points 220, 222. However, as would be understood by those skilled in the art, similar results may be obtained if the members are slidable, as described below, and rotatable through one hundred and eighty (180) degrees. Of course, alternate designs with varying degrees of rotation of the members 216, 218 are contemplated. However, 180 degrees or more of rotation provides the highest degree of adaptability of the microscope assembly 100 to various surfaces. Further, each channel member 216, 218 is slidable relative to the base 214 via the respective connection points 220 and 220. For example, the channel member 216 may be adjusted in an $x_1$, direction and the channel member 218 in an $x_2$ direction to stabilize the portable stand 102 as shown in FIG. 2B. Each connection point 220 and 222 may include a bearing to allow for fluid rotation of the channel members 216 and 218, and locking screws to fasten each channel member in a desired position.

As shown in FIG. 1, the microscope assembly 100 includes a confocal module 106 supported by the adjustable platform 202. The confocal module 106 is preferably a Nipkow disk type confocal module as these modules are less sensitive to transport. However, any other style of confocal microscope which becomes available with the required durability will work equally well with the assembly 100. The confocal module 106 according to this embodiment uses only one side of a rotating Nipkow disk for both light passing to and returning from the specimen. The confocal module 106 may be of any manufacture known to those of ordinary skill in the art. In the exemplary embodiment, the confocal module 106 is a K2S-BIO Nipkow disk module available from the Technical Instrument Company or the Zygo Corporation.

FIG. 3 shows schematically the operation of another exemplary confocal module 300. The exemplary confocal module 300 is a Nipkow disk type confocal module and includes a one-sided Nipkow disk 302. As one of ordinary skill in the art would understand, the Nipkow disk is, for example, substantially circular, approximately one (1) centimeter in diameter and includes a series of circular perforated holes located in an Achimedes spiral. The exemplary embodiment of the confocal module 300 uses only one side of the Nipkow disk 302 for both linearly polarized light 304 passing to a specimen 308 and reflected light 306 returning from the specimen 308 and includes, for example, a linear polarizing filter 310 with a transmission axis 312. The transmission axis 312 is an axis along which unfiltered light 314, received from an illumination system 108 (shown in FIG. 1), is allowed to pass. The exemplary confocal module 300 also includes a quarter wave plate 316 having a filter that retards or bends linearly polarized light 304 in a fast ("F") to slow ("S") direction, causing the light to circularly rotate, allowing polarization in all three hundred and sixty (360) degrees of rotation of the specimen 308 and creating incident right circularly polarized light 318. Reflected incident left circularly polarized light 320 is returned from the specimen 308 back through the quarter wave plate 316 and the Nipkow disk 302. Reflected light 306, including the reflected incident left circularly polarized light 320, passes through a second linear polarizing filter 322 through a transmission axis 324 to a microscope head or eyepiece, discussed in more detail below.

The illumination system 108 according to the present invention is shown in FIGS. 1 and 4. The illumination system 108 is preferably capable of operation at either 110V, 60 Hz or 220V, 50 Hz so that the device is suited for use in a wide geographic range. For example, the power input may be capable of switching automatically from 110V to 220V to be compatible with the local power supply. The illumination system 108 transmits a flat, intense beam of light at wavelengths suitable for both fluorescence and white light illumination. The illumination system 108 preferably includes a pre-aligned lamp and is constructed to be lightweight and robust. In an exemplary embodiment, the illumination system 108 is a Lambda LS Xenon Arc Lamp available from the Sutter Company in Novato, Calif. The illumination system 108 may include, for example, a 175 Watt or a 300 Watt full spectrum lamp.

As one of ordinary skill in the art will understand, the illumination system 108 delivers unfiltered light 314 to the confocal module 106 via a liquid light guide 110 as an intense flat beam of light. The liquid light guide 110 improves performance relative to conventional fiber optic light guides. Shown in FIG. 4, the illumination system 108 may include a light guide lens 402 adapted to transmit the flat beam of light via the liquid light guide 110. The illumination system 108 may also include a cooling fan 404 and a heat dissipater 406 to control the temperature of the illumination system 108.

As shown in FIG. 1, the exemplary embodiment of the microscope assembly 100 includes an optical assembly 112 housing at least one objective lens (not shown). For example, the optical assembly 112 may house a 10× lens (e.g., a 19 mm working height lens available from Thales Optem Inc. of Fairport, N.Y.) and a 20× lens (e.g., 20 mm working height lens available from Mitutoyo Asia Pacific Pte Ltd. of Singapore). In other embodiments according to the present invention, a 5× Thales Optem lens having a 34 mm working height may be used.

Another exemplary embodiment of an optical assembly 500 is shown in FIG. 5. The optical assembly 500 includes a coupler 502 adapted for removable connection to the confocal module 106. The optical assembly 500 includes an objective scope 504 in which the objective lens(es) are housed. Flexibility in magnification may be achieved through the use of a 0.5× charge-coupled device ("CCD")

adapter or by converting the fixed magnification optical assembly 112 into a zoom system as would be understood by those skilled in the art. For example, a 70 XL zoom module, available from Thales Optem Inc., may be used.

The objective scope 504 may be focused manually or, more preferably, via a motorized device under manual input or computer control. For example, the optical assembly 500 may include a z-axis motor 506. In this exemplary embodiment, the z-axis motor 506 is a Vexta PK 249-01AA motor available from Oriental Motor U.S.A. Corporation of Torrance, Calif. However, the z-axis motor 506 may be any low backlash motor providing sufficiently smooth start up and stopping. The z-axis motor 506 drives a focus gear system 508 to adjust the position of the objective scope 504 along a z-axis (e.g., vertical axis). As one of ordinary skill in the art will understand, adjusting the position of the objective scope 504 along the z-axis changes the position of the objective lens to alter the z-axis location of focus.

The z-axis motor 506 is preferably connected to a portable computer 114 (shown in FIG. 1) via a peripheral component interconnect ("PCI") bus to provide automated control via a scanning program. As would be understood by those of ordinary skill in the art, the portable computer 114 may be any computer sufficiently portable and capable of receiving PCI interface boards. In the exemplary embodiment, the portable computer 114 is a Shuttle XPC SB52G2 with a Pentium 4 Intel Processor running Windows XP, available, for example, from the Shuttle Computer Group in Los Angeles, Calif. The portable computer 114 includes a monitor 115 which is preferably thin and lightweight, and which may, for example, include wireless connectivity (e.g., a 802.11b wireless connection) and a touch screen. In the exemplary embodiment, the monitor 115 is a 15-inch Viewsonic Wireless Smart Display "Air Panel" V150p, available from Viewsonic Corporation in Walnut, Calif. The portably computer 114 may also include a flexible rubber keyboard (not shown) for increased portability and durability. The keyboard may be, for example, a "Virtually Indestructible Keyboard" available from GrandTec USA in Dallas, Tex. In other embodiments, the portable computer 114 may be a notebook or laptop computer.

The scanning program included in the portable computer 114 preferably controls the z-axis motor 506 and a stage 120, 600 (discussed below) for fully-automated x, y, and z image acquisition. In the exemplary embodiment, the scanning program includes Syncroscopy Auto-Montage and Montage Explorer software providing for fully in-focus image acquisition up to 20,000×20,000 pixel resolution in x and y (e.g., in a horizontal plane), and 1024×1024 image acquisition in z (e.g., up and down). Similar to the illumination system 108, the power input for the portable computer 114 is preferably capable of switching automatically from 110V to 220V to enhance compatibility with local power supplies. It is further contemplated that the microscope assembly 100, including the portable computer 110 and the illumination system 108, may be powered by a car battery, e.g., via a cigarette lighter adapter.

Shown in FIG. 1, the microscope assembly 100 further includes a trinocular head 116 including a binocular eyepiece, allowing for real time binocular viewing, and a camera port. The trinocular head 116 may include, for example, a Nikon Instruments head fitted with 10× eyepiece objectives. In the exemplary embodiment, the trinocular head 116 may be configured to allow approximately 100% of available light to be transmitted through the binocular eyepiece, or may direct a portion of the available light (e.g., 14% of available light) to the eyepiece with the remaining light being diverted to the camera port. As would be understood by those or ordinary skill in the art, a camera 118 may be removably connected to the camera port of the trinocular head 116. The camera 118 may include, for example, a high resolution (1360×1024 pixels) half inch (½") color CCD. In the exemplary embodiment, the camera is a JVC KY-F1030U digital camera including 1360×1024 SXGA digital image capture and available from the JVC Company of Japan. The camera 118 is preferably connected to the portable computer 114 via, for example, a Fire Wire IEEE 1394 digital interface to allow for the transmission to and storage of images in the computer 114. In preferred embodiments, the IEEE 1394 connection is a 6-pin connection capable of delivering power to the camera 118, thus eliminating the need for a separate power supply.

Shown in FIG. 1 and FIGS. 2A–2B, the microscope assembly 100 includes a free standing stage 120. The stage 120 may be of any size or shape to adequately support a desired specimen. In the exemplary embodiment, the stage is a KPL53 motorized precision micro-stepping X-Y stage, available from the Semprex Corporation in Campbell, Calif. The stage 120 is preferably freely movable relative to the stand 102 so that any desired relative position of the stage 120 with respect to the stand 102 and the optical assembly 112 may be selected. In another exemplary embodiment, the stage 120 may be movably and/or rotatably attached to the shaft 204, for example, in a manner similar to the coupling 206 of the platform 202.

Figure 6A:
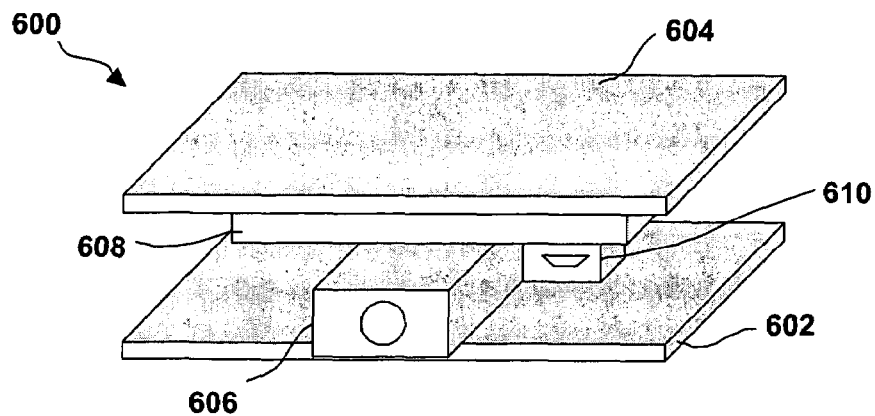
FIG. 6A shows schematically an isometric view of a specimen stage according to the present invention.
Figure 6B:
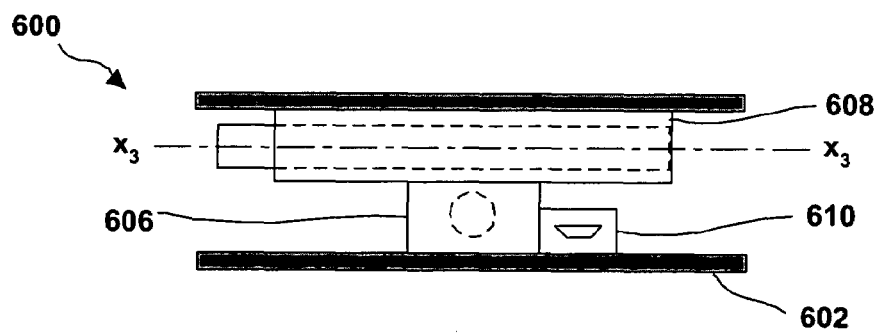
FIG. 6B shows schematically a cross-sectional view of a specimen stage according to the present invention.
Figure 6C:
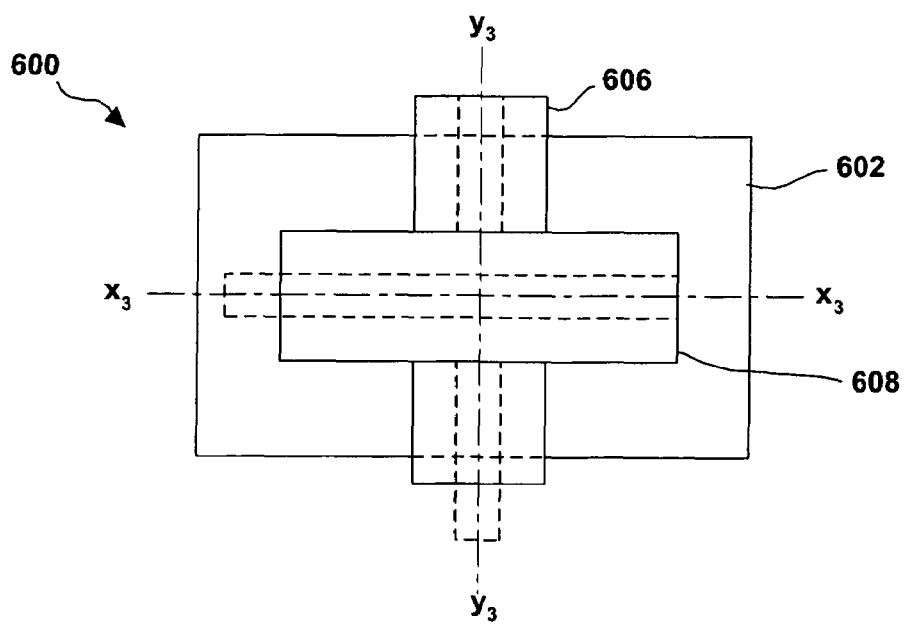
FIG. 6C shows schematically a top view of a specimen stage according to the present invention.

Another exemplary embodiment of a stage 600 according to the present invention is shown in FIGS. 6A–6C. The stage 600 includes a bottom plate 602 and a top plate 604, the bottom plate 602 being of any shape or size providing adequate stability. The top plate 604 may also be of any shape and size, and may further be transparent to allow for the transmission of light therethrough. Alternatively, the top plate 604 may include a reflective surface. The stage 600 includes an x-servo 608 and a y-servo 606 mounted between the bottom plate 602 and the top plate 604 and substantially perpendicular to one another. The x-servo 608 and y-servo 606 may, for example, be DC powered and may include rotary encoders in a closed-loop system to ensure accurate positioning. As one of ordinary skill in the art will understand, the x-servo 608 may be controlled to displace the top plate 604 in either direction along an axis $X_3$ (as shown in FIGS. 6B and 6C) while the y-servo 606 may be controlled to displace the top plate 604 and the x-servo 608 in either direction along an axis $y_3$ shown in FIG. 6C. The x-servo 608 and the y-servo 606 are connected to the portable computer 114, for example, via a servo port 610. In the exemplary embodiment, the servo port 610 is a PCI connection.

As discussed above, the portable computer 114 contains a scanning program. As one of ordinary skill in the art will understand, the scanning program may control the position of the objective scope 504 and the stage 120 or 600 to automatically scan a specimen on the stage 120 or 600. For example, the microscope assembly 100 may be assembled in a desired location and a specimen may be placed on the stage 120 or 600. The adjustable platform 202 of the portable stand 102 may be adjusted to position the optical assembly 112 an adequate distance above the specimen. For example, the adjustable platform 202 may be adjusted to have the optical assembly 112 between zero (0) and eighteen (18) inches above the specimen. The scanning program may then be engaged to control the stage 120, 600 to scan the specimen by, for example, controlling the position of the objective scope 504 and the stage (e.g., stage 120 or stage 600) to automatically scan the selected portions of the specimen and record images using the camera 118. The microscope assembly 100 may non-destructively acquire internal micro-structural detail of a specimen (e.g., 1–100 micrometers deep to the surface) and provide two-dimensional ("2-D") and three-dimensional ("3-D") reconstruction for storage on the portable computer 114.

The microscope assembly 100 according to the present invention is portable to allow for use at any location. For example, the microscope assembly 100 may be capable of transport to distant and/or remote locations. The microscope assembly 100 may, for example, be disassembled and packed in one or more travel cases (not shown) for transport to any number of locations. More specifically, the microscope assembly 100 may be transported in two travel cases, e.g., one 1600 model Protector Case and one 1610 model Protector Case provided by Pelican Products Inc. in Torrance, Calif. It is contemplated that the microscope assembly 100 and travel cases may weigh approximately sixty (60) kilograms or less.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A portable confocal microscope, comprising:
   a portable microscope stand including a shaft having top and bottom ends, a platform connected to the shaft by a height adjustment mechanism so that the position of the platform along the shaft may be varied, a base member connected to the bottom end of the shaft and first and second elongated channel members slidably and rotatably connected to the base member, the first and second channel members extending in a plane substantially perpendicular to an axis of the shaft;
   an optical assembly including an objective lens including a first position adjustment mechanism for adjusting a position of the objective lens along a first axis;
   a confocal module transmitting light to and receiving light from a specimen to be imaged via the optical assembly;
   an image acquisition system recording images through the optical assembly;
   a specimen stage for supporting the specimen to be imaged including a second position adjustment mechanism for moving the stage along a second and third axis; and
   a computer controlling the first and second position adjusting mechanisms to generate a desired image for recording by the image acquisition system.

2. The portable confocal microscope according to claim 1, wherein the confocal module includes a Nipkow disk.

3. The portable confocal microscope according to claim 1, further comprising:
   an illumination system transmitting light to the confocal module via a light guide.

4. The portable confocal microscope according to claim 1, wherein the optical assembly further includes a zoom module.

5. The portable confocal microscope according to claim 1, the first position adjustment mechanism including a z-axis motor for adjusting the position of the objective lens along the first.

6. The portable confocal microscope according to claim 1, wherein the second position adjusting mechanism includes a first servo for moving the stage along the second axis and a second servo for moving the stage along the third axis.

7. The portable confocal microscope according to claim 1, wherein the specimen stage is connected to the shaft via a rotatable coupling mechanism.

8. The portable confocal microscope according to claim 1, further comprising:
   a trinocular head including a binocular eyepiece.

9. The portable confocal microscope according to claim 1, wherein the objective lens is a 5× lens, a 10× lens, or a 20× lens.

10. The portable confocal microscope according to claim 1, wherein the computer includes a keyboard and a monitor.

11. The portable confocal microscope according to claim 1, wherein the computer is a notebook computer.

12. The portable confocal microscope according to claim 1, the portable confocal microscope being adaptable for 110V and 220V AC power connectivity.

13. The portable confocal microscope according to claim 1, the portable confocal microscope being adaptable for DC power connectivity.

14. A portable microscope stand, comprising:
    a shaft having top and bottom ends;
    a platform connected to the shaft by a height adjustment mechanism so that the position of the platform along the shaft may be varied;
    a base member connected to the bottom end of the shaft; and
    first and second elongated channel members slidably and rotatably connected to the base member, the first and second channel members extending in a plane substantially perpendicular to an axis of the shaft, the first and second channel members configured to slide and rotate in the plane.

15. The portable microscope stand according to claim 14, further comprising:
    including a specimen stage connected to the shaft via a rotatable coupling mechanism.

16. The portable microscope stand according to claim 14 being produced substantially of aluminum.

17. The portable microscope stand according to claim 14, wherein the height adjustment mechanism includes a crank and a lead screw.

18. The portable microscope stand according to claim 14, wherein the height adjustment mechanism includes at least one locking screw and at least one compression ring.

19. A portable confocal microscope, comprising:
    a portable microscope stand including a shaft having top and bottom ends, a platform connected to the shaft, a base member connected to the bottom end of the shaft and first and second elongated channel members slidably and rotatably connected to the base member, the first and second channel members extending in a plane substantially perpendicular to an axis of the shaft, the first and second channel members configured to slide and rotate in the plane;
    an optical assembly including an objective lens;
    a specimen stage supporting a specimen; and
    a confocal module transmitting light to and receiving light from the specimen via the optical assembly.

20. The portable confocal microscope according to claim 19, further comprising:
    an image acquisition system recording images through the optical assembly.

* * * * *